United States Patent [19]

Henrick et al.

[11] 3,739,018
[45] June 12, 1973

[54] 11-AZA-10 KETO DIPHATIC COMPOUNDS
[75] Inventors: Clive A. Henrick; John B. Siddall, both of Palo Alto, Calif.
[73] Assignee: Zoecon Corporation, Palo Alto, Calif.
[22] Filed: Jan. 18, 1971
[21] Appl. No.: 107,431

[52] U.S. Cl.. 260/482 R, 260/247.7 H, 260/268 C, 260/293.83, 260/326.3, 260/534 R, 260/561 N, 260/561 B, 424/300
[51] Int. Cl. ........................................ C07c 101/28
[58] Field of Search ........................... 260/482, 534

[56] References Cited
UNITED STATES PATENTS
3,228,972  1/1966  Schwartz............................ 260/482

Primary Examiner—Henry R. Jiles
Assistant Examiner—Paul J. Killos
Attorney—Donald W. Erickson

[57] ABSTRACT

Novel 11-aza-10 keto aliphatic compounds prepared by the reaction of an allylic alcohol with N,N-dialkylacetamide dialkyl acetal useful for insect control.

8 Claims, No Drawings

11-AZA-10 KETO DIPHATIC COMPOUNDS

This invention relates to novel 11-aza-10-keto compounds of formula (A) which are useful for the control of insects:

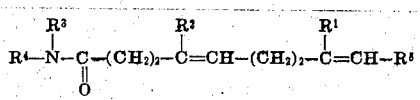

(A)

wherein each of $R^1$, $R^2$, $R^3$ and $R^4$ is lower alkyl and $R^5$ is one of the groups

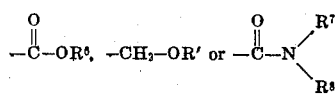

in which $R^6$ is hydrogen, lower alkyl, cycloalkyl or aralkyl, $R'$ is hydrogen, carboxylic acyl or hydrocarbon group of one to 12 carbon atoms; and each of $R^7$ and $R^8$ is hydrogen, alkyl, alkenyl, cycloalkyl, hydroxyalkyl, alkoxyalkyl, phenyl, or, when taken together with the nitrogen atom to which they are attached, pyrrolidino, morpholino, piperidino, piperazino, or 4-alkylpiperazino.

The compounds of formula A are prepared according to the following outlined process. Each of $R^1$, $R^2$, $R^3$, $R^4$ and $R^5$ is as defined above and $R^9$ is lower alkyl.

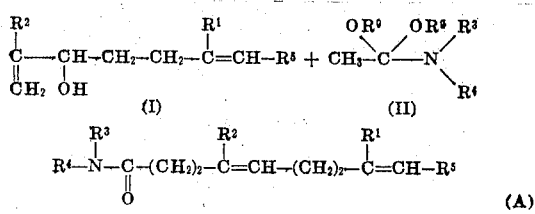

In the practice of the above process, an allylic alcohol of formula I is reacted with a compound of formula II in an organic solvent inert to the reaction such as a hydrocarbon, e.g., xylene, toluene or benzene. The reaction is generally carried out at the reflux temperature of the reaction mixture and is complete within a few hours.

The allylic alcohols of formula I can be prepared as described by Anderson et al., J. Am. Chem. Soc. 92, 735 (1970) or as described in application Ser. No. 7987, filed Feb. 2, 1970, the disclosure of which is incorporated by reference.

The compounds of formula (A) are useful for the control of insects. The compounds are applied using either liquid or solid carriers such as water, acetone, cottonseed oil, xylene, mineral oil, silicon, talc, natural and synthetic resins and the like. Generally, compositions for application will contain up to about 75 percent of the active compound and more usually less than 25 percent, sufficient composition should be applied to provide from about 0.1 to 25 micrograms of the active compound per insect. The compounds of formula (A) can be formulated advantageously with other insect control compounds such as natural Cecropia juvenile hormone and analogs thereof for increased effectiveness. Typical insects controlled by the present invention are diptera such as mosquitos and houseflies, Hemiptera such as Pyrrhocoridae and Miridae; Lepidoptera such as Pyralidae and Gelechidae, and Coleoptera such as Tenebrionidae, Crysomelidae and Dermestidae. For example, *Pyrrhocoris apterus, Lygus hesperus, Galleria mellonella, Plodia interpuctella, Phthorimoea operculelha, tenebrio molitor, Triboleum confusm, diabrotica duodecimpunctata, Dermestes maculatus, Aedes aegypti and musca domestica*. Without any intention of being bound by theory, the compounds of formula (A) are believed to be effective by reason of hormonal action in that unlike conventional insecticides which are effective by reason of causing immediate death, the compounds of formula (A) are effective by reason of physiological changes caused in the treated insect which result in eventual death of the insect and/or inability of the treated insect to reproduce by reason of sterility or abnormal development.

The term "carboxylic acyl," as used herein, refers to a carboxylic acyl group of from one to twelve carbon atoms which is derived from an esterification agents such as acetic anhydride, propionic anhydride, benzoic anhydride, n-butyric anhydride, formic acetic anhydride, acetic propionic anhydride, heptoic anhydride, n-caproic anhydride, phenylacetic anhydride, p-methoxybenzpic anhydride, acetyl chloride, propionyl chloride, n-butyryl chloride, isobutyryl chloride, n-valeryl chloride, trimethyl-acetyl chloride, benzoyl chloride, and the like. When modified by the term "lower," the carboxylic acyl group is an aliphatic carboxylic acyl group of one to six carbon atoms.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl.

The term "alkyl," as used herein, refers to a straight or branched chain saturated aliphatic hydrocarbon group having a chain length of one to 12 carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl," as used herein, refers to an alkyl group substituted with one hydroxy group, e.g., hydroxymethyl, p-phydroxyethyl and 4-hydroxypentyl. The term "alkoxyalkyl," as used herein, refers to an alkyl group substituted with one alkoxy group, e.g., methoxymethyl, 2-methoxyethyl, 4-ethoxybutyl, n-propoxyethyl and t-butylethyl. The term "alkenyl," as used herein, refers to an ethylenically unsaturated hydrocarbon group, branched or straight chain, having a chain length of two to 12 carbon atoms, e.g., allyl, vinyl, 3-butenyl, 2-butenyl, 2-hexenyl and i-propenyl. Whenever the foregoing terms are modified by the word "lower," the chain length of the group is not more than six carbon atoms with the exception of lower alkoxyalkyl in which a total chain length of 12 carbon atoms is the maximum.

The term "hydrocarbon group of one to 12 carbon atoms" as used herein, refers to alkyl, cycloalkyl and aralkyl.

The following examples are provided to illustrate the present invention.

EXAMPLE 1

A mixture of 0.77 g. of methyl 6-hydroxy-7-methylene-3-methylnon-2-enoate, 532 mg. of N, N-dimethylacetamide dimethylacetal and 12 ml. of dry xylene is refluxed under argon for about 40 hours. The mixture is then cooled and worked up by charging it directly to a silica gel column (30 g.) packed in hexane. The column is eluted with ether; hexane and the eluate obtained from using 75 to 90 percent ether is distilled to yield methyl 10-oxo-3,11-dimethyl-7-ethyl-11-azadodeca-2,6-dienoate.

The process of this example is repeated using each of ethyl 6-hydroxy-7-methylene-3-methylnon-2-enoate, methyl 6-hydroxy-7-methylene-3-methyloct-2-enoate, ethyl 6-hydroxy-7-methylene-3-methyloct-2-enoate, and ethyl 6-hydroxy-7-methylene-3-ethylnon-2-enoate as the allylic alcohol starting material to yield each of ethyl 10-oxo-3,11-dimethyl-7-ethyl-11-azadodeca-2,6-dienoate, methyl 10-oxo-3, 7, 11, -trimethyl-11-azadodeca-2,6-dienoate, ethyl 10-oxo-3, 7, 11-trimethyl-11-azadodeca-2,6-dienoate, and ethyl 10-oxo-11-methyl-3,7-diethyl-11-azadodeca-2, 6-dienoate,(A; $R^1=R^2=R^3=R^4=$ methyl, $R^5=$ COOEthyl).

EXAMPLE 2

Using the process of Example 1, N, N-diethylacetamide dimethyl-acetal is reacted with each of ethyl 6-hydroxy-7-methylene-3-methyloct-2-enoate and ethyl 6-hydroxy-3-methylnon-2-enoate to yield each of ethyl 10-oxo-3, 7-dimethyl-11 ethyl-11-azatridecar-2,6-dieonate and ethyl 10-oxo-3-methyl-7, 11-diethyl-11-azatrideca-2,6-dienoate, By the use of N-methyl-N-ethylacetamide dimethylacetal in the foregoing procedure, there is prepared each of ethyl 3, 7, 11-trimethyl-10-oxo-11-azatrideca-2,6-dienoate and ethyl 10-oxo-3, 11-dimethyl-7-ethyl-11-azatrideca-2, 6-dienoate.

EXAMPLE 3

Following the procedure of Example 1, N, N-diethyl 6-hydroxy-7-methylene-3-methylnon-2-enamide and N, N-diethyl 6-hydroxy-7-methylene-3-methyloct-2-enamide is reacted with N, N-dimethylacetamide dimethyl-acetal to yield N, N-diethyl 10-oxo-7-ethyl-3, 11, dimethyl-11-azadodeca-2, 6-dienamide and N, N-diethyl 10-oxo-3,7, 11-trimethyl-11-azadodeca-2, 6-dienamide, respectively.

Examples of other amides of formula I which can be used as the starting material in the foregoing process include N, N-dimethyl 6-hydroxy-3-methyloct-2-enamide, N, N-dimethyl 6-hydroxy-3-methylnon-2-enamide, N, N-di-isopropyl 6-hydroxy-3-methylnon-2-enamide, and N, N-diethyl 6-hydroxy-7-methylene-3-ethylnon-2-enamide.

EXAMPLE 4

Following the procedure of Example 1, each of 1-ethoxy-6-hydroxy-7-methylene-3-methylnon-2-ene and 1-ethoxy-6-hydroxy-7-methylene-3-methyloct-2-ene is reacted with N, N-dimethylacetamide dimethylacetal to yield 1-ethoxy-10-oxo-3, 11-dimethyl-7-ethyl-11-azadodeca-2,6-diene and 1-ethoxy-10-oxo-3, 7, 11-trimethyl-11-azadodeca-2, 6-diene, respectively. Examples of other ethers and esters of formula I can be used as starting materials in the foregoing process include 1-methoxy-6-hydroxy-3-methyloct-2-ene, 1-acetoxy-6-hydroxy-3-methyloct-2-ene, and 1-ethoxy-6-hydroxy-3-ethylnon-2-ene.

EXAMPLE 5

A mixture of 1 g. of methyl 10-oxo-3, 7-dimethyl-11-ethyl-11-azatrideca-2,6-dienoate, 60 ml. of methanol, 0.2 g. of sodium carbonate and 6 ml. of water is stirred at about 30° for about 12 hours. The mixture is diluted with water, neutralized and then extracted with ether. The organic extracts are combined, washed with water, dried over sodium sulfate and evaporated to yield 10-oxo-3,7-dimethyl-11-ethyl-11-azatrideda-2,6-dienoic acid.

In the description herein, the isomerism at positions C- 2,3 and C- 6,7 of the compounds of formula A can be cis or trans. Preferably, the isomerism at position C- 2,3 is trans or a mixture of trans/cis. The isomerism at position C- 6,7 is preferably trans or a mixture of trans/cis. Thus, the preferred starting materials of formula I have trans configuration or a mixture of trans/cis at C- 2,3. The isomers are separated using gas chromatography or fractional distillation.

What is claimed is:

1. A compound selected from those of the following formula (A):

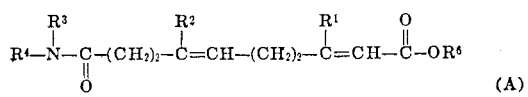

(A)

wherein each of $R^1$, $R^2$, $R^3$ and $R^4$ is lower alkyl and $R^6$ is hydrogen or lower alkyl.

2. A compound according to claim 1 wherein each of $R^1$, $R^2$, $R^3$ and $R^4$ is lower alkyl of one to three carbon atoms.

3. A compound according to claim 2 wherein $R^6$ is lower alkyl.

4. A compound according to claim 3 wherein $R^1$ is methyl and $R^6$ is methyl or ethyl.

5. A compound according to claim 4 wherein $R^2$ is methyl or ethyl and each of $R^3$ and $R^4$ is methyl.

6. A compound according to claim 4 wherein $R^2$ is methyl or ethyl and each of $R^3$ and $R^4$ is ethyl.

7. A compound according to claim 4 wherein $R^2$ is methyl or ethyl, $R^3$ is methyl and $R^4$ is methyl or ethyl.

8. A compound according to claim 3 wherein each of $R^1$, $R^3$, $R^4$ and $R^6$ is methyl and $R^2$ is ethyl.

* * * * *